Dec. 5, 1939.  R. P. GARRISON  2,182,614
SEALING GASKET
Filed May 29, 1936
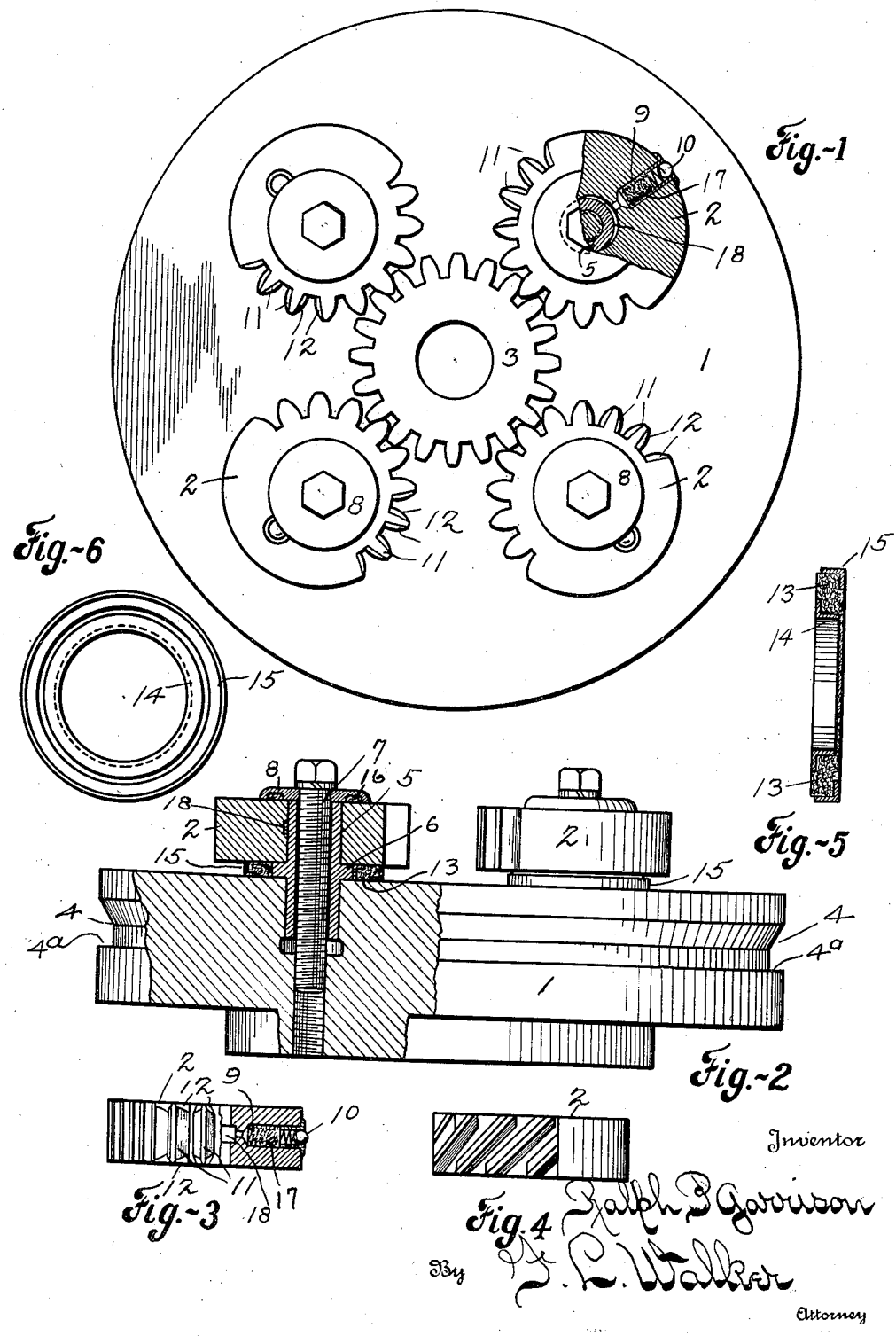
Inventor
Ralph P. Garrison
By J. L. Walker
Attorney Patented Dec. 5, 1939

2,182,614

UNITED STATES PATENT OFFICE 2,182,614

SEALING GASKET

Ralph P. Garrison, Dayton, Ohio, assignor to Garrison Machine Works, Incorporated, Dayton, Ohio, a corporation of Ohio Application May 29, 1936, Serial No. 82,543

1 Claim. (Cl. 288—1)

This invention pertains to a sealing gasket and, more particularly, to a seal for use between relatively movable members. For illustrative purposes, but with no intent to unduly limit the invention, it has been herein shown and described in conjunction with a simple form of gear chuck for engaging and holding small spur pinions wherein the gear is intermeshed with gear segments mounted for unison rotation about slightly eccentric axes into and out of clamping engagement with the gear. It is to be understood, however, that the invention forming the subject matter hereof is applicable to other uses, and for use with mechanisms other than gear chucks.

One object of the invention is to simplify the construction as well as the means and mode of operation of sealing gaskets, whereby they may not only be economically manufactured, but will be more efficient in use, of greater accuracy and increased durability, easily operated and unlikely to get out of repair.

A further object of the invention is to provide an effective and efficient seal for use between relatively movable members which will serve not only to exclude dirt and grit, but will also retain lubricant.

A further object of the invention is to provide an improved form of sealing gasket for use between relatively movable members.

With the above primary and other incidental objects in view as will more fully appear in the specification, the invention consists of the features of construction, the parts and combinations thereof, and the mode of operation, or their equivalents, as hereinafter described and set forth in the claim.

Referring to the drawing wherein is illustrated the preferred but obviously not necessarily the only form of embodiment of the invention, Fig. 1 is a top plan view of a spur gear chuck embodying the present invention and showing a gear pinion engaged therein.

Fig. 2 is a side elevation partly in section of the assembled gear chuck.

Fig. 3 is a side elevation, partly in section, of one of the gear engaging elements illustrating the improved shape of the loading teeth.

Fig. 4 is a similar view of a gear engaging element for use with spiral gears.

Fig. 5 is a sectional view of a dirt and grease seal collar removed from the assembly.

Fig. 6 is a detail plan view of the angle retaining rings for the sealing collar illustrating their relative size and disposition.

Like parts are indicated by similar characters of reference throughout the several views.

Accuracy and speed of operation are paramount factors in the use of gear chucks.

It is highly important in commercial production that the gears operated upon may be quickly inserted into the chuck and removed therefrom with minimum lost motion. Such chucks are ordinarily mounted upon grinders, boring mills or other apparatus where they are exposed to water or cutting fluid which becomes charged with grit from the grinding wheel and with metallic particles from the gear.

Such grit and foreign material are quite likely to enter the bearings of the gear engaging elements and cause undue wear resulting in lost motion, thereby destroying the accuracy of the chuck.

In the present instance the loading teeth of the gear engaging segments, comprising those located on the shorter radii of the eccentrically mounted segments, are transversely beveled at their extremities to facilitate the entrance therebetween of the teeth of the gear to be centered. The bearings are protected against entrance of grit and dirt and also against escape of lubricant by metal bound felt collars which surround the bearing studs of the gear engaging segments beneath such elements.

Referring to the accompanying drawing, 1 is a mounting head or support of circular form upon the face of which are mounted in different radial positions a series of oscillatory gear segments 2—2 of which four are shown.

The teeth of the gear segments 2 are disposed slightly eccentric with the axis of oscillation. By inserting a gear 3 in intermeshing relation with the several segments 2 and transmitting to the inserted gear 3 a slight rotary motion, the segments 2 are simultaneously oscillated to exert a clamping pressure upon the gear incident to their eccentricity, to thereby hold the gear 3 in adjusted position. The segments being accurately proportioned and shaped, and equally accurately mounted on the support 1, serve to center the gear 3 in relation with the support.

The support 1 in turn is mounted in accurately centered relation upon the grinder, boring mill or other apparatus with which it is to be used. To insure accuracy in this respect, the circular support 1 is provided with a peripheral groove or recess 4, the bottom of which is exactly concentric with the head and with the circle on which the gear segments 2 have their axes. The lateral face 4a of the recess is exactly perpendicular to the axis of the chuck or coincident with the plane of rotation. These right angle faces within the recess 4 are provided for application of a suitable surface test indicator after the chuck has been mounted on its driving mandrel, to insure the disposition of the chuck in accurately centered relation with the axis of rotation and in a plane accurately perpendicular thereto. The opposite side of the peripheral recess or groove 4 is beveled to afford more convenient access for such test purposes.

The gear segments 2 are mounted upon bearing studs 5 seated in accurately located holes in the support 1 and provided at mid-length with peripheral collars 6 which abut upon the face of the support 1 and on which in turn the segments 2 abut. The bearing studs 5 are secured in place and the segments held thereon by screws 7 extending axially through bores in the bearing studs and which hold in place beyond the segments, retaining collars or discs 8. Each segment is provided with a lubricant passage 9 closed by a conventional spring closure 10.

To facilitate insertion of the gear 3 to be centered the loading teeth 11 of the segments 2 are terminally beveled or chamfered at opposite sides as at 12. The chamfered loading teeth 11 are those on the shorter radii of the eccentric segments 2. The segments are rotated on their mounting studs 5 to present the loading teeth 11 in the innermost position. The gear 3 to be centered is then easily meshed therewith. By subsequent partial rotation of the gear 3 the segments are adjusted in unison to bring other teeth on longer radii of the segments into engaging relation with the teeth of the engaged gear 3, to center the gear and hold it in such adjusted relation. To prevent the escape of lubricant and entrance of dirt and grit into the gear segment bearings, which would cause undue wear and consequent looseness and lost motion and thereby destroy the accuracy of the chuck, there are provided sealing collars. The sealing collars surround the bearing studs 5 coincident with their peripheral collars 6 intermediate the segments 2 and the mount or support 1.

Each sealing collar comprises a flat annulus 13 of resilient material, preferably although not necessarily of felt. Both interiorly and exteriorly of the resilient collar 13 are metallic retaining rings 14 and 15. The rings 14 and 15 are of angle formation in cross section affording rabbets in which the inner and outer margins of the felt ring 13 are seated. These rings 14 and 15 are reversely disposed whereby the planar flanges of the respective rings will overlap opposite sides of the felt ring 13, while the circumferential flanges thereof conform closely to the felt collar 13. They are of such relative diameters that when assembled in concentric relation with each other, and with the intermediate felt collar 13, they will be radially offset out of overlapping relation with each other, thereby permitting a free yielding movement of the resilient collar. The circumferential flanges of the rings 14 and 15 are preferably of slightly less depth than the thickness of the resilient collar 11, so that the latter may be subject to a moderate degree of compression between the segments and support to insure sufficiently close contact to exclude dirt and grit and to confine the lubricant.

A collar 8 overlying the segment has an annular groove formed in its underface in which is seated a felt sealing ring or collar 16.

To provide lubricant for the segments 2 each segment is provided with a counterbored oil passage in the outer end of which is located the spring closure 10. The oil passage is reduced at its inner end contiguous to the bearing upon the stud 5. The larger portion of this bearing is filled with a porous pack 17 of felt or of balsa wood which serves to hold a supply of lubricant and allow it to seep slowly into the bearing.

Interiorly of the journaled bearing of the segment 2 upon the stud 5 and coincident with the inner end of the lubricant passage there is provided an eccentric groove 18 disposed with its maximum depth at the point of intersection of the lubricant passage. At the opposite side of the bearing this oil distributing groove 18 merges into the surface of the journaled bearing.

It is desirable that the chuck be mounted upon the machine for rotation in such direction that the resistance offered by the grinding wheel or other machine operation will tend to rotate the engaged gear and segments to tighten the segments upon the gear. Sometimes the machine is constructed to rotate the chuck in one direction and sometimes in the opposite direction. To enable the chuck to be so mounted that the tendency will be to tighten the gear segments upon the engaged gear the terminal edges at both ends of the loading teeth 11 are preferably chamfered as at 12 thus enabling the segments to be reversed and facilitate the engagement of the gear 3 whichever side of the segment may be uppermost and to enable the grinding wheel to exert a tightening influence upon the segments whichever direction the chuck may operate.

Instead of being provided with spur teeth as in Figs. 1, 2, and 3, the segments may have helical teeth as shown in Fig. 4 for engagement of a corresponding helical gear.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

Having thus described my invention, I claim:

A seal for use between relatively movable members, including an inner ring and an outer ring, each of substantially L-shape in cross-section disposed in inverted relation, whereby to form annular spaces which extend outwardly and inwardly respectively of one of the members, and which spaces are disposed in planes that are spaced with relation to each other transversely of the plane of the member, a floating compressible packing collar between the rings having its respective side portions extending in part in said spaces, and having portions thereof lying substantially flush with the outer surfaces of the rings, and providing opposed zones of packing material staggered with respect to each other, said packing collar being of a greater thickness than the depth of the aforesaid spaces, whereby to provide for relative axial movement of the rings and compression of the collar.

RALPH P. GARRISON.